US011807453B2

(12) United States Patent
Ingram-Tedd et al.

(10) Patent No.: US 11,807,453 B2
(45) Date of Patent: Nov. 7, 2023

(54) OBJECT STORAGE, HANDLING, AND RETRIEVING SYSTEM AND METHOD

(71) Applicant: OCADO INNOVATION LIMITED, Hatfield (GB)

(72) Inventors: Andrew John Ingram-Tedd, Hatfield (GB); Lars Sverker Ture Lindbo, Hatfield (GB); Pawel Karolinczak, Hatfield (GB)

(73) Assignee: OCADO INNOVATION LIMITED, Hatfield Herts (GB)

( * ) Notice: Subject to any disclaimer, the term of this patent is extended or adjusted under 35 U.S.C. 154(b) by 57 days.

(21) Appl. No.: 17/022,928

(22) Filed: Sep. 16, 2020

(65) Prior Publication Data

US 2020/0407160 A1 Dec. 31, 2020

Related U.S. Application Data

(63) Continuation of application No. 15/580,469, filed as application No. PCT/EP2016/063059 on Jun. 8, 2016, now Pat. No. 10,822,166.

(30) Foreign Application Priority Data

Jun. 8, 2015 (GB) ..................................... 1509921

(51) Int. Cl.
*B65G 1/04* (2006.01)
*B65G 1/137* (2006.01)
(52) U.S. Cl.
CPC ......... *B65G 1/0464* (2013.01); *B65G 1/1378* (2013.01)

(58) Field of Classification Search
CPC ........................... B65G 1/0464; B65G 1/1378
See application file for complete search history.

(56) References Cited

U.S. PATENT DOCUMENTS

| 2,701,065 A | 2/1955 | Bertel |
| 4,909,697 A | 3/1990 | Bernard, II et al. |
| (Continued) | | |

FOREIGN PATENT DOCUMENTS

| CA | 2772829 A1 | 3/2011 |
| CN | 1103772 A | 6/1995 |
| (Continued) | | |

OTHER PUBLICATIONS

Office Action issued dated Nov. 30, 2021, by the Canadian Patent Office in corresponding Canadian Patent Application No. 2,988,473. (4 pages).

(Continued)

*Primary Examiner* — Saul Rodriguez
*Assistant Examiner* — Ashley K Romano
(74) *Attorney, Agent, or Firm* — BUCHANAN, INGERSOLL & ROONEY PC

(57) ABSTRACT

An object handling and retrieving system and method are described. A storage system is described suitable for storing multiple product lines in an automated warehouse environment. The storage system includes a plurality of load handling devices disposed above a frame and independently moveable to access different stacks. The load handling device can retrieve and transport a target container to a sequencing and temporary storage portion having a sorting frame for taking delivery of the target container and moving it to an output port of the sorting frame.

14 Claims, 15 Drawing Sheets

(56) References Cited

U.S. PATENT DOCUMENTS

| | | | |
|---|---|---|---|
| 5,707,199 | A | 1/1998 | Faller |
| 6,654,662 | B1 | 11/2003 | Hognaland |
| 7,012,211 | B2 | 3/2006 | Brinkley et al. |
| 7,575,407 | B2 | 8/2009 | Tsujimoto |
| 7,861,844 | B2 | 1/2011 | Hayduchok et al. |
| 8,915,690 | B2 | 12/2014 | Ota |
| 9,061,839 | B2* | 6/2015 | Murayama ........ H01L 21/67715 |
| 9,387,986 | B2* | 7/2016 | Wenzel ................... B65G 1/04 |
| 9,499,349 | B2 | 11/2016 | Hansl et al. |
| 9,617,082 | B2* | 4/2017 | Baker .................. B65G 1/1373 |
| 9,751,209 | B2* | 9/2017 | Caveney ................. B25J 18/04 |
| 9,760,086 | B2 | 9/2017 | Woodtli et al. |
| 10,497,594 | B2* | 12/2019 | Suzuki ....................... B25J 9/04 |
| 10,800,606 | B2* | 10/2020 | Lert, Jr. ............... B65G 1/0492 |
| 10,822,166 | B2 | 11/2020 | Ingram-Tedd et al. |
| 10,994,930 | B2* | 5/2021 | Lert ....................... B65G 1/065 |
| 11,142,400 | B2* | 10/2021 | Abou-Chakra ........ B65G 1/065 |
| 2003/0209473 | A1 | 11/2003 | Brinkley et al. |
| 2007/0032903 | A1 | 2/2007 | Tsujimoto |
| 2008/0213067 | A1 | 9/2008 | Jegers |
| 2008/0281717 | A1 | 11/2008 | Kortelainen |
| 2011/0130869 | A1 | 6/2011 | Linge et al. |
| 2012/0275886 | A1 | 11/2012 | Ota |
| 2013/0015675 | A1 | 1/2013 | Pickard et al. |
| 2013/0223959 | A1 | 8/2013 | Koholka |
| 2014/0017052 | A1 | 1/2014 | Honkanen et al. |
| 2014/0039667 | A1 | 2/2014 | Collin |
| 2014/0088748 | A1 | 3/2014 | Woodtli et al. |
| 2015/0104286 | A1 | 4/2015 | Hansl et al. |
| 2015/0127143 | A1 | 5/2015 | Lindbo et al. |
| 2016/0129587 | A1 | 5/2016 | Lindbo et al. |
| 2016/0194151 | A1 | 7/2016 | Lindbo et al. |
| 2017/0176082 | A1 | 6/2017 | Hognaland |
| 2018/0162639 | A1 | 6/2018 | Ingram-tedd et al. |
| 2019/0263589 | A1 | 8/2019 | Clarke et al. |

FOREIGN PATENT DOCUMENTS

| | | |
|---|---|---|
| CN | 1671488 A | 9/2005 |
| CN | 1891582 A | 1/2007 |
| CN | 1980844 A | 6/2007 |
| CN | 102556559 A | 7/2012 |
| CN | 103764523 A | 4/2014 |
| CN | 104159837 A | 11/2014 |
| DE | 19935742 A1 | 2/2001 |
| DE | 102009017241 A1 | 10/2010 |
| DE | 202009014456 | 4/2011 |
| EP | 0767113 B1 | 7/2002 |
| EP | 1331179 A1 | 7/2003 |
| EP | 1760012 A1 | 3/2007 |
| EP | 2327644 A1 | 6/2011 |
| EP | 3303185 A1 | 4/2018 |
| JP | S 63-160906 U | 10/1988 |
| JP | H 04-116001 A | 4/1992 |
| JP | H0725428 A | 1/1995 |
| JP | H 09-278117 A | 10/1997 |
| JP | H 1087019 A | 4/1998 |
| JP | 2007076831 A | 3/2007 |
| NO | 317366 B1 | 10/2004 |
| WO | 9849075 A1 | 11/1998 |
| WO | 2011113053 A1 | 9/2011 |
| WO | 2012069327 A1 | 5/2012 |
| WO | 2013090962 A1 | 6/2013 |
| WO | 2013167907 A1 | 11/2013 |
| WO | 2014075937 A1 | 5/2014 |
| WO | 2014089586 A1 | 6/2014 |
| WO | 2014203126 A1 | 12/2014 |
| WO | 2015019055 A1 | 2/2015 |
| WO | 2015185628 A2 | 12/2015 |
| WO | 2016-198467 A1 | 12/2016 |
| WO | 2016-198469 A1 | 12/2016 |

OTHER PUBLICATIONS

Office Action (Decision of Rejection) dated Feb. 2, 2021, by the Japanese Patent Office in corresponding Japanese Patent Application No. 2017-564111, and an English Translation of the Office Action. (11 pages).

International Search Report (PCT/ISA/210) dated Sep. 8, 2016, by the Japanese Patent Office as the International Searching Authority for International Application No. PCT/EP2016/063059.

Written Opinion (PCT/ISA/237) dated Sep. 8, 2016, by the Japanese Patent Office as the International Searching Authority for International Application No. PCT/EP2016/063059.

Office Action (Communication) dated Mar. 16, 2022, by the European Patent Office in corresponding European Patent Application No. 16733888.8. (6 pages).

First Office Action dated Jul. 19, 2019, by the Chinese Patent Office in corresponding Chinese Patent Application No. 201680036548.9, and an English Translation of the Office Action. (13 pages).

Office Action dated Sep. 2, 2019, by the European Patent Office in corresponding European Patent Application No. 16733888.8. (8 pages).

Office Action dated Mar. 18, 2021, by the Canadia Patent Office in corresponding Canadian Patent Application No. 2,988,478. (3 pages).

Office Action (Notification of Reason for Refusal) dated Mar. 27, 2021, by the Korean Patent Office in corresponding Korean Patent Application No. 10-2017-7037058, and an English Translation of the Office Action. (6 pages).

First Office Action dated Jun. 28, 2022, by the Japanese Patent Office in corresponding Japanese Patent Application No. 2021-092842, and an English Translation of the Office Action. (9 pages).

Office Action dated Mar. 13, 2023, by the Korean Patent Office in corresponding Korean Patent Application No. 10-2022-7022620, and an English Translation of the Office Action. (6 pages).

Office Action (Notice of Reasons for Refusal) dated Sep. 20, 2022, by the Japanese Patent Office in corresponding Japanese Patent Application No. 2017-564111, and an English Translation of the Office Action. (13 pages).

First Office Action dated Aug. 23, 2023, by the Chinese Patent Office in corresponding Chinese Patent Application No. 202011448817.7, and an English Translation of the Office Action. (10 pages).

* cited by examiner

OBJECT STORAGE, HANDLING, AND RETRIEVING SYSTEM AND METHOD

The present invention relates to storage systems and methods for retrieving units from a storage system. In particular, but not exclusively, the invention relates to a robotic system for handling bins in a store comprising a grid of stacked units.

The present application hereby incorporates by reference U.S. Pat. No. 7,861,844, and PCT Patent Publication Numbers WO/2013/167907 and WO/2015/019055. The content of these applications and publications is hereby considered to be included in the present application.

The present application claims priority from UK Patent application number GB1509921.1 filed on 8 Jun. 2015 the content of which is incorporated by reference.

BACKGROUND TO THE INVENTION

Some commercial and industrial activities require systems that enable the storage and retrieval of a large number of different products. One known system for the storage and retrieval of items in multiple product lines involves arranging storage bins or containers on rows of shelves arranged in aisles. Each bin or container holds a plurality of products of one product type. The aisles provide access between the rows of shelves, so that the required products can be retrieved by operatives or robots that circulate in the aisles. It will be appreciated, however, that the need to provide aisle space to access the products means that the storage density of such systems is relatively low. In other words, the amount of space actually used for the storage of products is relatively small compared to the amount of space required for the storage system as a whole.

An additional disadvantage of the system described above results from the requirement that to compile a customer order comprising a number of objects in to at least one delivery may require several aisles to be accessed for a single order. This becomes a particular issue if the volume of orders to be compiled is high.

In an alternative approach, which offers a significant improvement in storage density, containers are stacked on top of one another and the stacks are arranged in rows. The containers are accessed from above, removing the need for aisles between the rows and allowing more containers to be stored in a given space.

Whilst this method, to be described in more detail below, offers the ability to access all parts of the storage system and move all objects via load handling devices to all work stations, this may cause congestion among the load handlers on top of the grid.

Methods of handling containers stacked in rows have been well known for decades. In some such systems, for example as described in U.S. Pat. No. 2,701,065, free-standing stacks of containers are arranged in rows in order to reduce the storage volume associated with storing such containers while still providing access to a specific container if required. Access to a given container is made possible by providing relatively complicated hoisting mechanisms which can be used to stack containers and to remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B (Cimcorp). Cimcorp discloses a mechanism for removing a plurality of stacked containers using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack). The load handler can be used to move containers between single-product stacks, for example to add a plurality of containers containing a single type of product to the store, and to pick up one or more containers from two or more single-product stacks to create a multi-product output stack. An example of this is the picking of vegetable crates in a central warehouse to create a multi-product order for delivery to retail stores.

In the system described in Cimcorp, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler. Furthermore, the system is not well adapted for the selection of a single container from a multi-product stack.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices operative on tracks located on the top of the frame structure. The load handling devices lift bins or containers out from the stacks, multiple load handling devices co-operating to access bins or containers located in the lowest positions of the stack. A system of this type is illustrated schematically in FIGS. 1 to 4 of the accompanying drawings.

As shown in FIGS. 1 and 2, stackable containers, known as bins 10, are stacked on top of one another to form stacks 12. The stacks 12 are arranged in a grid framework structure 14 in a warehousing or manufacturing environment. FIG. 1 is a schematic perspective view of the framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is further described in Norwegian patent number 317366, the contents of which are incorporated herein by reference. FIGS. 3(a) and 3(b) are schematic perspective views of a load handling device 30 from the rear and front, respectively, and FIG. 3(c) is a schematic front perspective view of a load handling device 30 lifting a bin 10. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 is suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown).

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 3(c). The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34, 36.

As shown in FIG. 4, a plurality of identical load handling devices 30 are provided, so that each load handling device 30 can operate simultaneously to increase the throughput of the system. The system illustrated in FIG. 4 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10. This is achieved in an operation referred to hereafter as "digging".

Referring to FIG. 4, during a digging operation, one of the load handling devices 30 sequentially lifts each non-target bin 10a from the stack 12 containing the target bin 10b and places it in a vacant position within another stack 12. The target bin 10b can then be accessed by the load handling device 30 and moved to a port 24 for further transportation.

Each of the load handling devices 30 is under the control of a central computer. Each individual bin 10 in the system is tracked, so that the appropriate bins 10 can be retrieved, transported and replaced as necessary. For example, during a digging operation, the locations of each of the non-target bins 10a is logged, so that the non-target bins 10a can be tracked.

The system described with reference to FIGS. 1 to 4 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10b is not at the top of a stack 12.

In a typical installation, the stacks 12 can be up to twenty-four bins tall. This means that, to access a target bin 10b that is towards the bottom of the stack 12, it is necessary first to remove a large number of non-target bins 10a. The digging process consumes a large part of the operating time of the load handling devices 30, reducing the efficiency and increasing the cost of the system, because it is necessary to provide multiple load handling devices 30 to avoid delays.

The digging operation is relatively slow, and it can take many minutes to access a target bin 10b that is situated towards the bottom of a stack 12. It will be appreciated that multiple digging operations have a cumulative negative effect on the efficiency of the system. To mitigate delays caused by digging operations, the picking process needs to be orchestrated a long time in advance, typically at least thirty minutes. As a result, the system cannot react quickly to changes in demand without significant loss of productivity.

Another strategy for minimising the time spent on digging operations is to arrange the bins 10 in the stack 12 so that the most frequently accessed bins 10 are close to the top of the stacks 12. However, this approach becomes limited in applications in which products are picked to assemble orders that consist of a relatively large number of products selected from a very large number of product lines, because it is always likely that a small number of comparatively rarely-ordered products, requiring a time-consuming digging operation, will be present in each order.

Against this background, it would be desirable to provide systems and methods that reduce or mitigate some of the above-described problems.

Accordingly, for some applications, the use of multi-product stacks, in which the containers making up each stack may hold different products, is favoured in order to maximise the storage density of the system. The stored items must remain accessible reasonably quickly and easily, so that a plurality of different items required to fulfil a customer order can be picked from the storage system in an efficient way, even if some of the items required are stored in a lower level of a stack, underneath several other containers.

It is a disadvantage of the systems described above that fast moving or frequently accessed items stored within containers in the storage system must be continually removed and replaced by the load handling devices. This leads to excessive over use of the load handling devices and reduces efficiency.

Against this background, it would be desirable to provide systems and methods that reduce or mitigate some of the above-described problems.

SUMMARY OF THE INVENTION

According to a first aspect, the present invention resides in an object handling and retrieval system comprising a storage system, a plurality of load handling devices, a drop off point and a workstation, the storage system comprising two substantially perpendicular sets of rails forming a grid above a workspace, the workspace comprising a plurality of stacked containers, the robotic load handling devices operating on the grid above the workspace, the load handling devices comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid above any stack of containers by driving only the set of wheels engaged with the rails, wherein at least one drop off point is adapted to engage with a sequencing portion, the sequencing portion being adapted so as to receive containers delivered to the or each drop off point by a load handling device and move said delivered containers to the workstation in a predetermined order. The sequencing portion further comprises a frame located adjacent the storage system, the frame being provided with a plurality of container storage positions, the sequencing portion being further provided with moving means for moving containers from the container storage positions within the frame to the workstation, in a predetermined order, said predetermined order being irrespective of the order in which the containers reached the drop off point such that objects located within the containers may be accessed at the workstations.

The provision of a sequencing portion having storage locations therein provides a solution to the problem of load handling devices continually accessing a small number of bins containing frequently required objects. In such a case, the load handling device need only lift the bin containing the frequently needed objects once, said bin being locatable adjacent the workstation to which the object requires transferring, in a quickly accessible storage location that may be sequenced to arrive at the workstation when required.

Preferably there are a number of drop off points at which the or each container may be transferred from the storage system to the sequencing and storage portion. The ability to drop multiple containers off at a given time at a given sequencing and storage portion further reduces the impact of congestion in load handling devices on the grid.

Preferably each sequencing and storage portion may have a plurality of drop off points associated therewith. However, it will be appreciated that, depending on the configuration of the sequencing and storage portion, only a single drop off point may be provided.

Advantageously this reduces load handling device congestion on the grid.

To this end, the sequencing and storage portion may be configured to store a number of bins containing objects required frequently.

Preferably, the moving means within the sequencing and storage portion may comprise a plurality of vehicles moveably located within the frame, the vehicles carrying containers around the frame. The moving means may comprise a series of shuttles located on a subsidiary track within the frame, each shuttle being adapted to carry a containers around the frame.

The frame of the storage and sequencing portion may preferably comprise an access port adjacent a workstation such that containers moving around the frame on the moving means are accessible whilst on the moving means when said container is adjacent an access port at the workstation.

Preferably the storage and sequencing portion further comprises diverting means, said diverting means being adapted to divert containers from the moving means to the storage positions and from the storage positions to the moving means.

In this way, the containers being stored in the storage and sequencing portion may be transferred between a temporary storage location and a location accessible from the workstation.

Preferably the diverting means comprises a pushing and pulling mechanism acting on the container such that the container of the moving means may be pushed from the track in to a storage location or pulled from the storage location on to the track.

In a second embodiment of the invention, the moving means comprises at least one picking means located adjacent the frame, the picking means being adapted so as to select a predetermined container from the frame and transport the container to the workstation.

In this embodiment of the invention, a container may be removed and/or replaced from a modified stack of containers. Preferably, the modified stack of containers may be accessed from one side by the moving means using means for supporting all the containers above the target container whilst removing the target container onto the moving means. In a similar fashion, the container may be replaced in the modified stack of containers.

Preferably, the object handling system further comprises a control utility for selecting the containers and sequencing their arrival at the workstation port in the required order.

Preferably the object handling system further comprises selecting means adapted so as to select containers, such that any container can be selected for movement to a workstation, said selecting means comprising a control utility for controlling and monitoring the position of all containers within the system.

In this way, the order of arrival of the container or containers at the sequencing and storage portion of the object handling system is not important, the selecting means and control utility acting on containers within the sequencing and storage portion ensures the correct container arrives at the workstation port at the correct time in the correct order, with a greatly reduced number of lifting operations required by the load handling devices.

In a further aspect of the invention there is provided a method of retrieving containers from a container storage system and transporting the containers to a workstation comprising the steps of (a) identifying target containers; (b) retrieving the targets container from the storage system using load handling devices; (c) transporting the containers to a drop off point using the load handling devices, the drop off point being associated with a sequencing portion. The sequencing portion comprises moving means for sequencing the target containers for movement to a position adjacent the workstation using the moving means, the containers arriving at a container access point, associated with a workstation, in a predetermined order, said predetermined order being irrespective of the order in which the containers arrived at the sequencing portion.

Preferably, the method of retrieving containers further comprising the step of locating the target containers in storage locations associated with the sequencing portion of the storage system, the storage locations being accessible to the moving means.

Preferably, the method further comprises the step of controlling the sequencing of the containers using controlling means, the controlling means monitoring the position of each target container in the storage system.

The invention will now be described with reference to the accompanying diagrammatic drawings in which.

Figure 1:
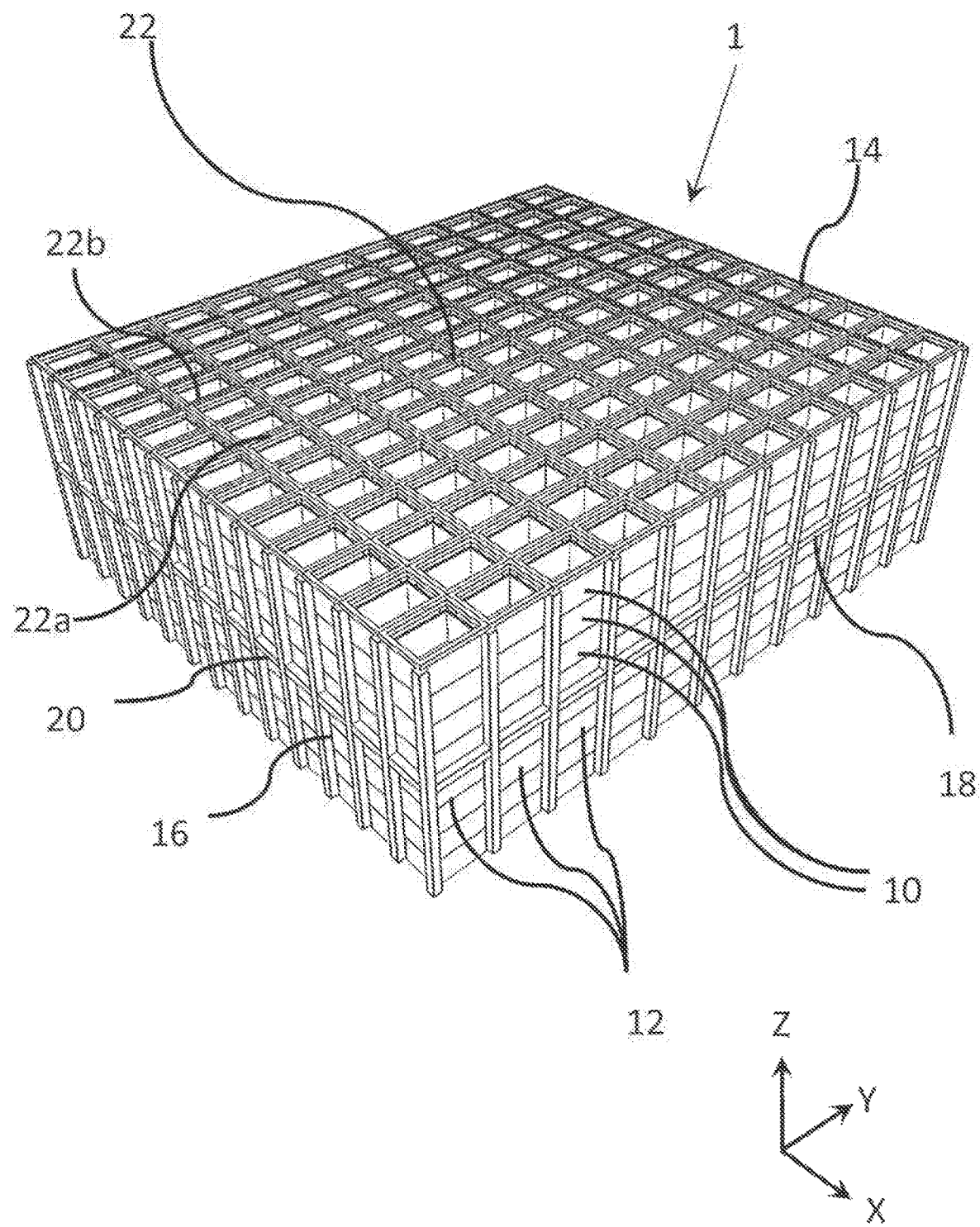
FIG. 1 is a schematic perspective view of a frame structure for housing a plurality of stacks of bins in a known storage system.
Figure 2:
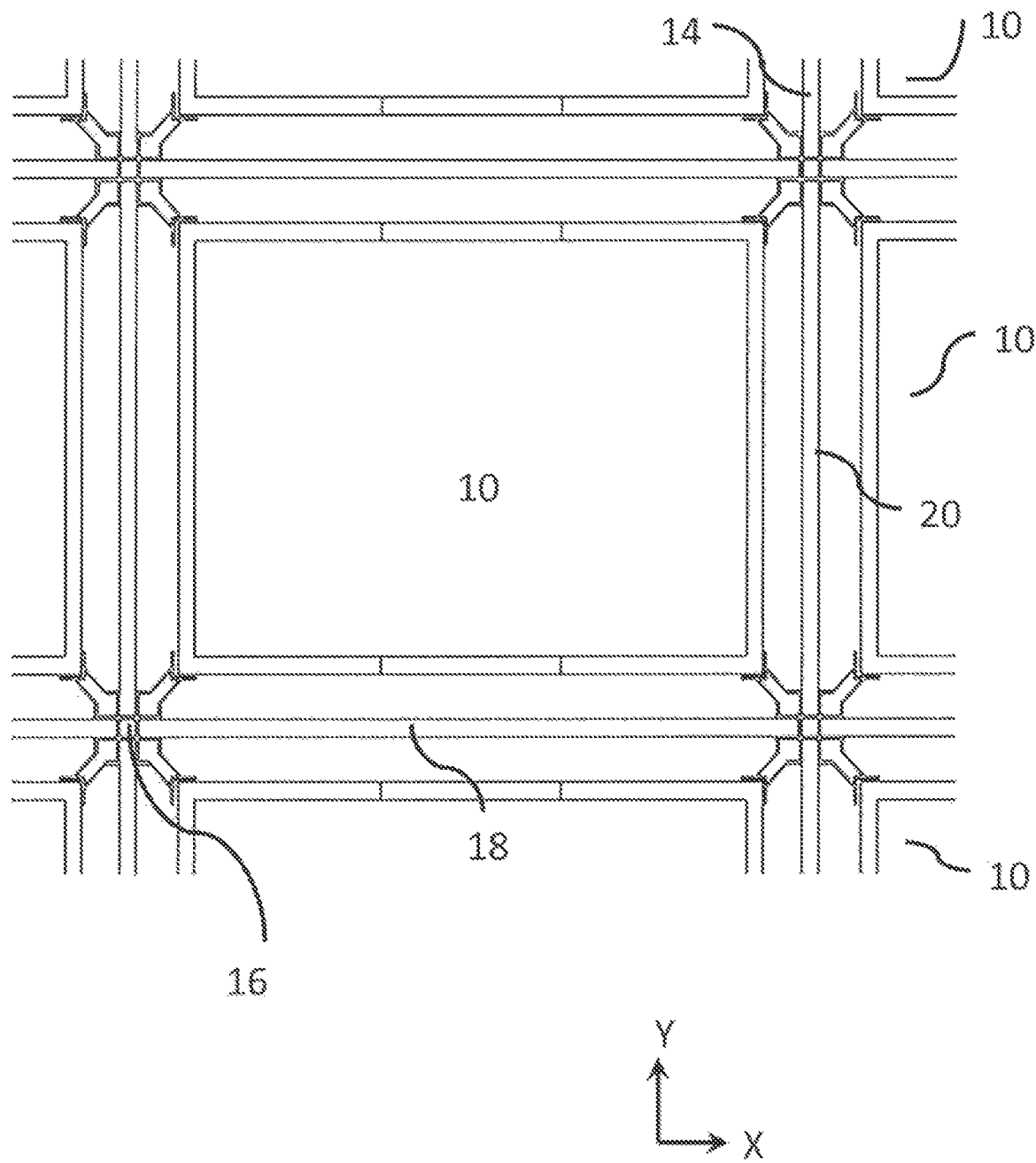
FIG. 2 is a schematic plan view of part of the framework structure of FIG. 1.
Figure 3A:
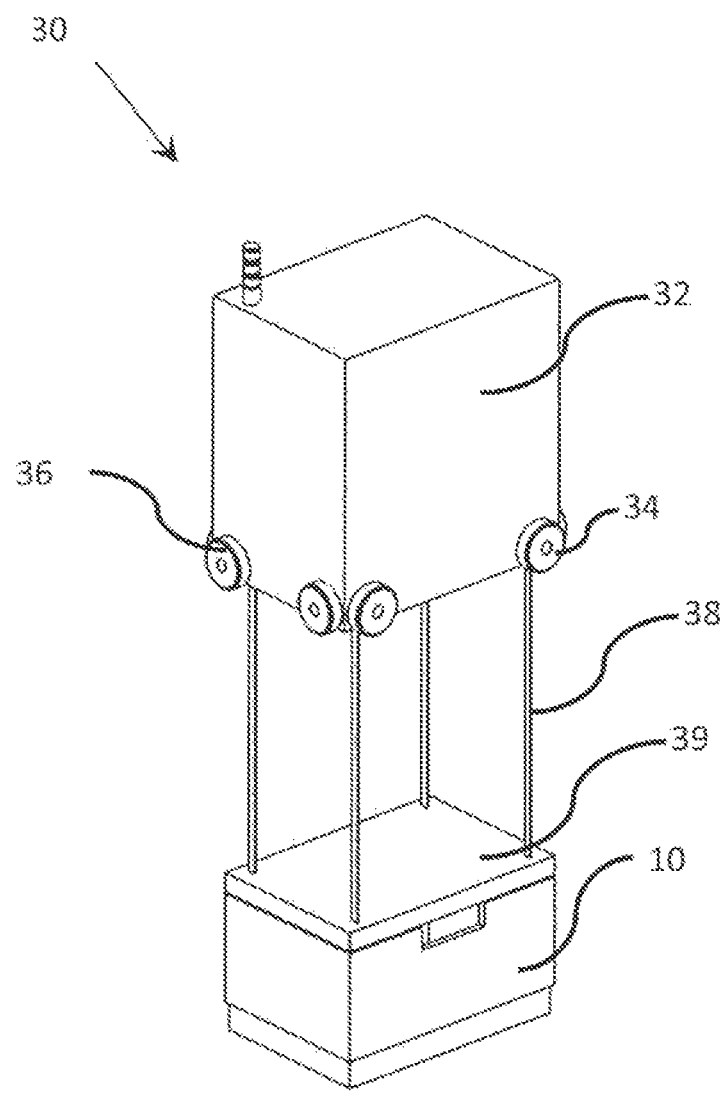
Figures 3B, 3C:
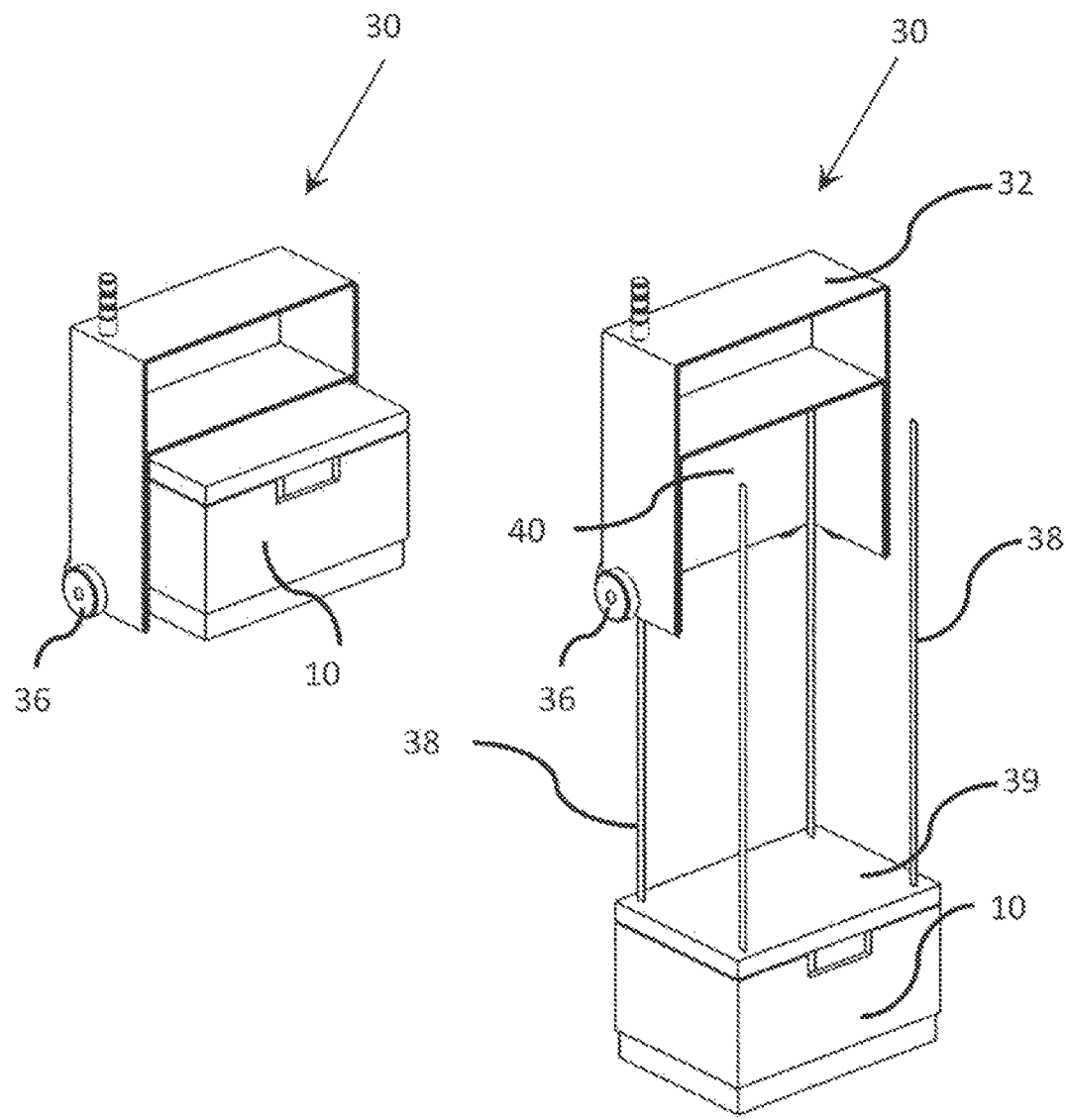
Figure 4:
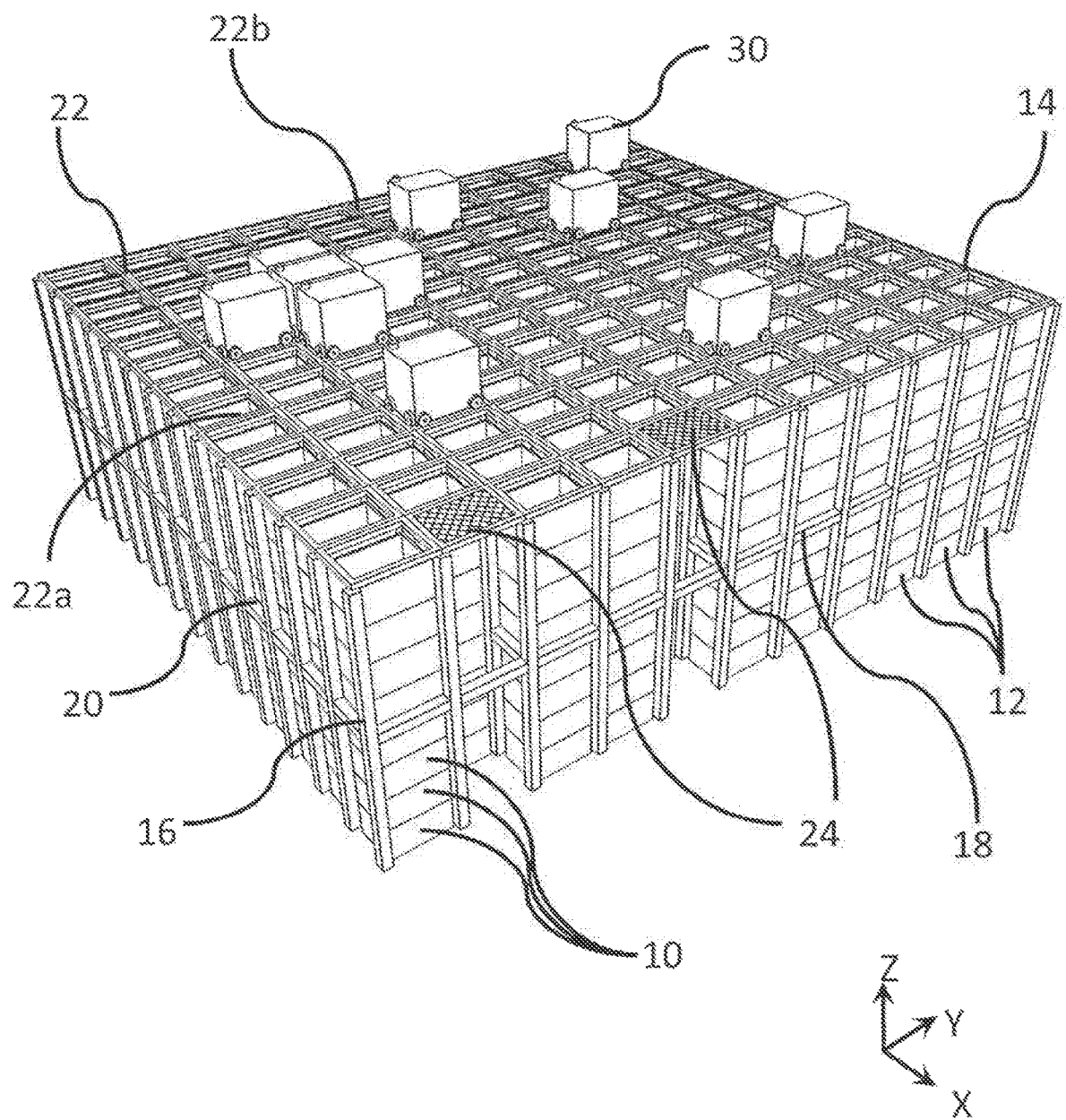

FIGS. 3(a) and 3(b) are schematic perspective views, from the rear and front respectively, of one form of load handler device for use with the frame structure of FIGS. 1 and 2, and FIG. 3(c) is a schematic perspective view of the known load handler device in use lifting a bin;

FIG. 4 is a schematic perspective view of a known storage system comprising a plurality of load handler devices of the type shown in FIGS. 3(a), 3(b) and 3(c), installed on the frame structure of FIGS. 1 and 2, the storage system comprising a plurality of drop off points or output ports.

Figure 5A:
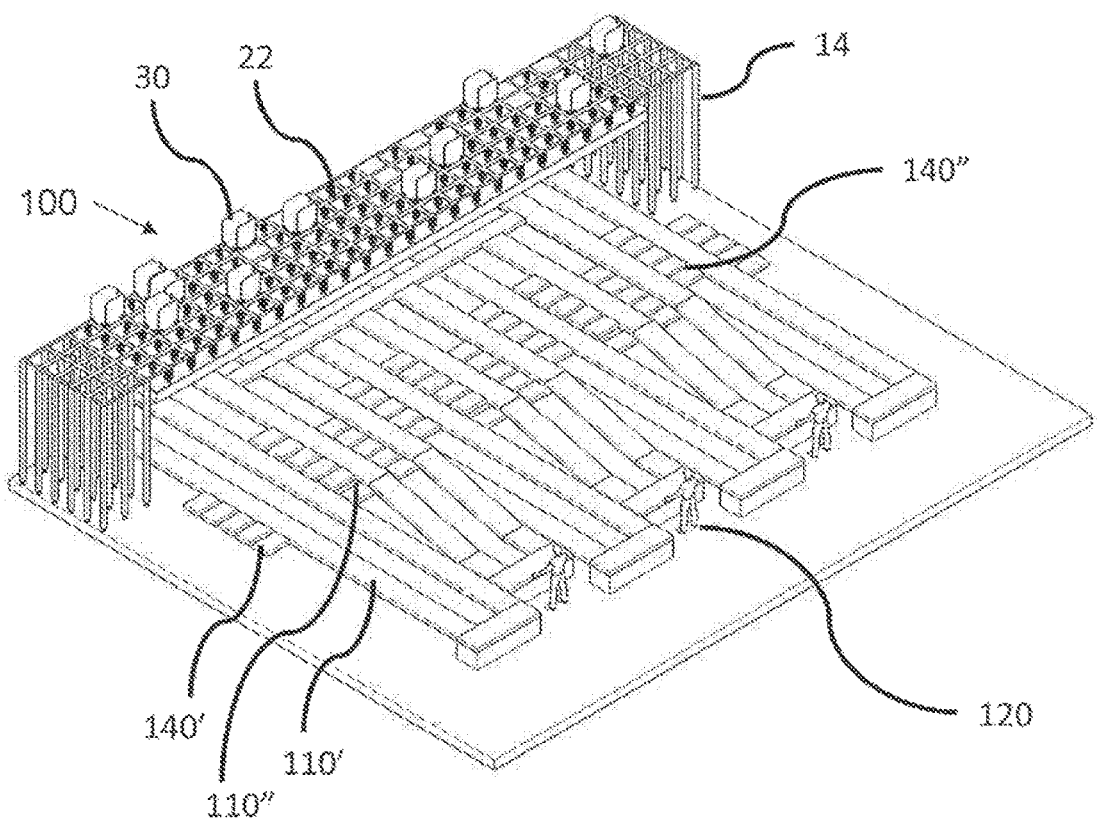
Figure 5B:
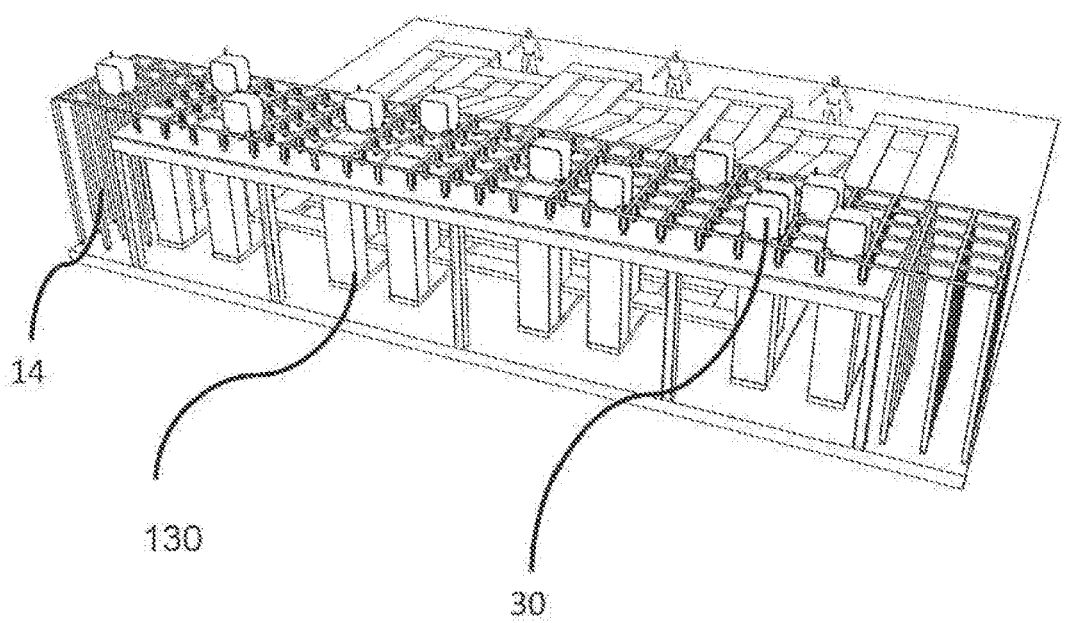
Figure 6A:
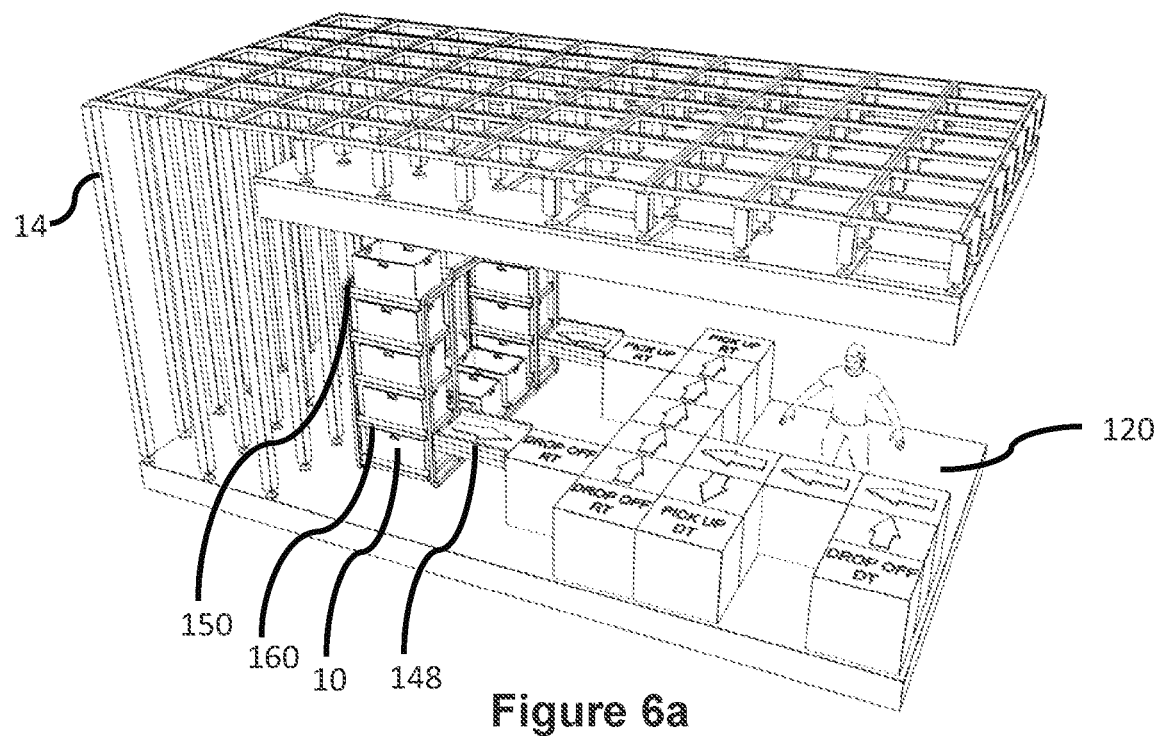
Figure 6B:
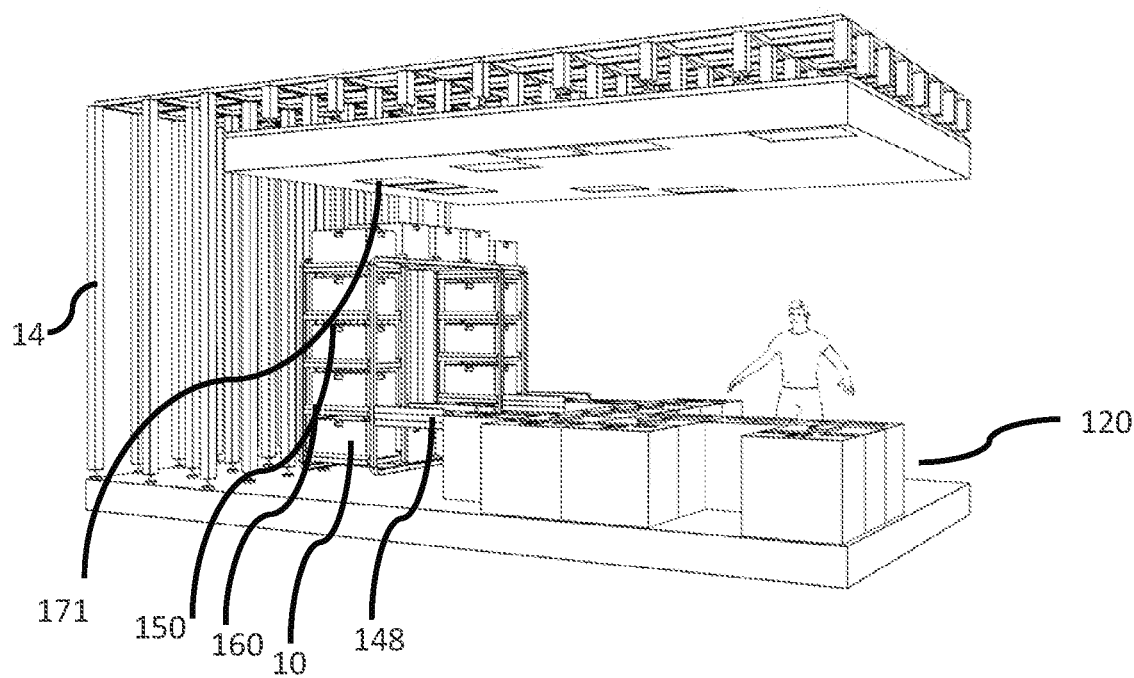
Figure 7:
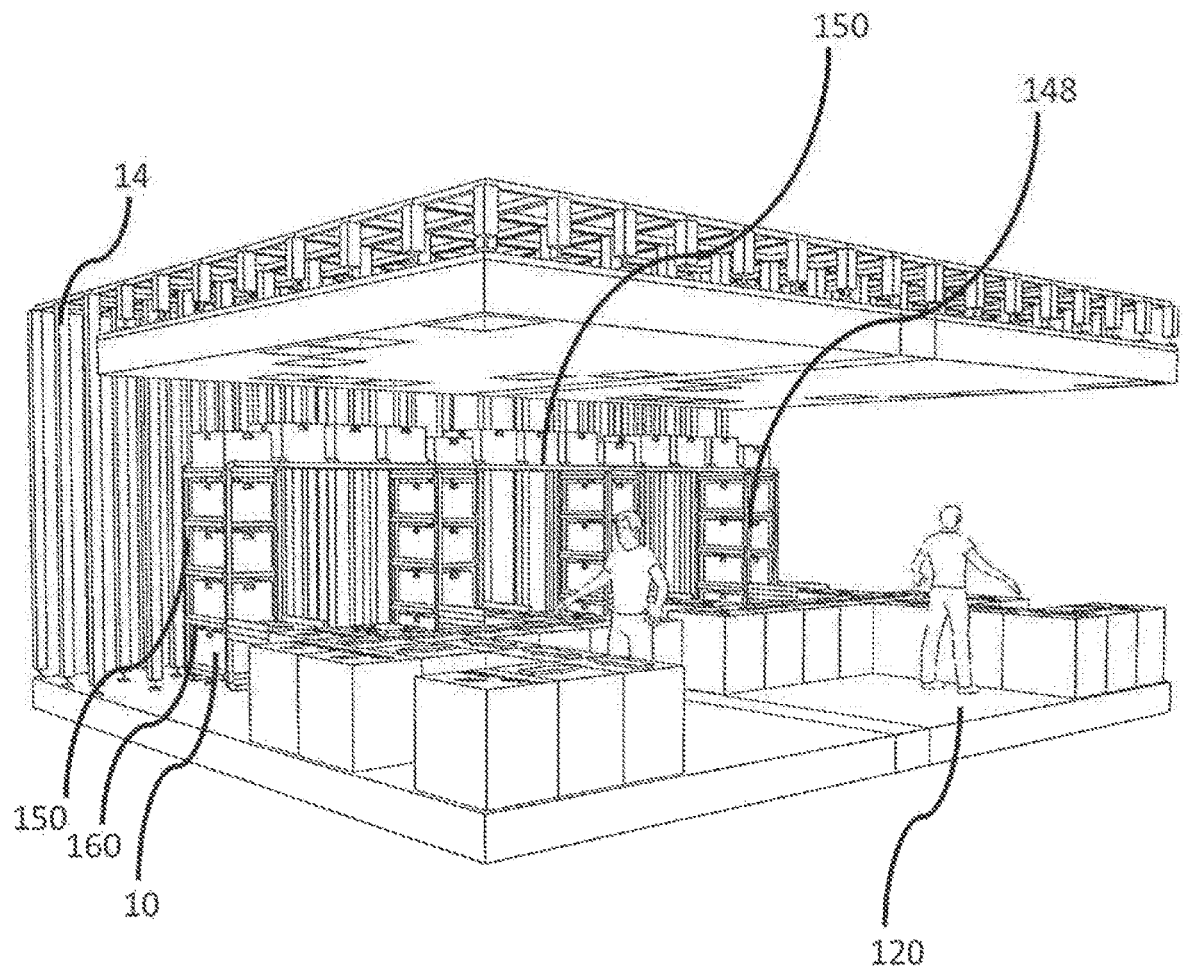
Figure 8A:
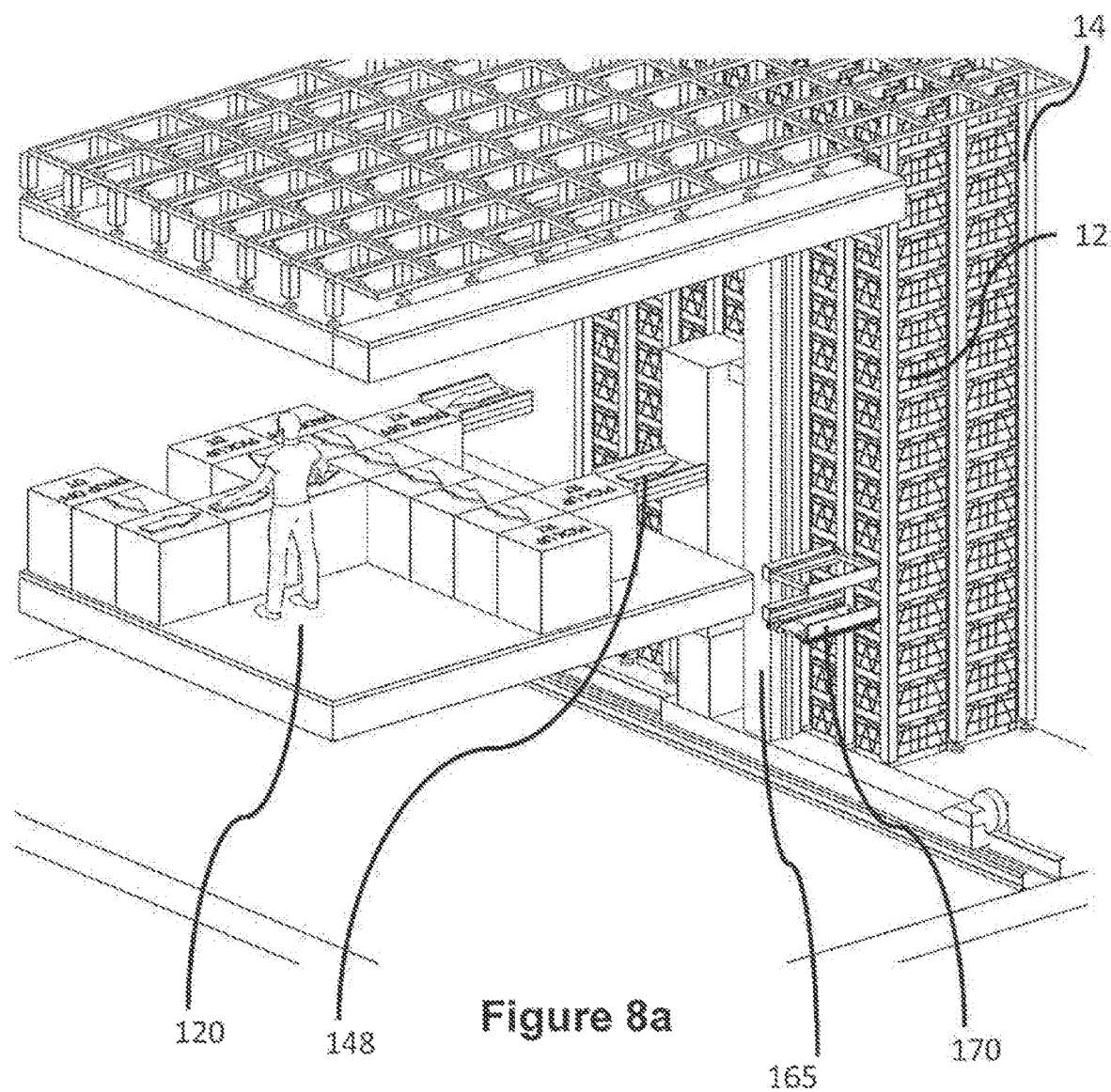
Figure 8B:
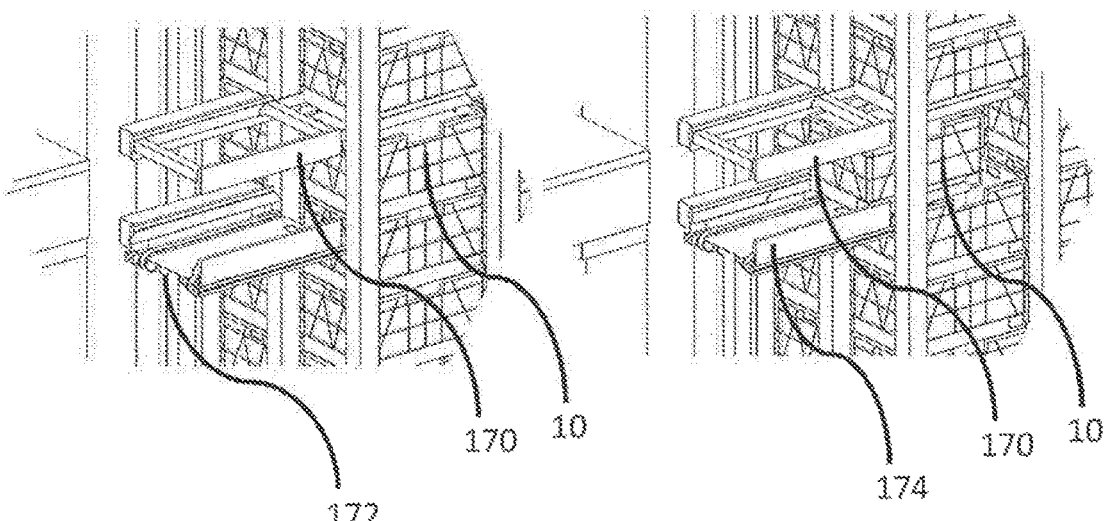
Figure 9A:
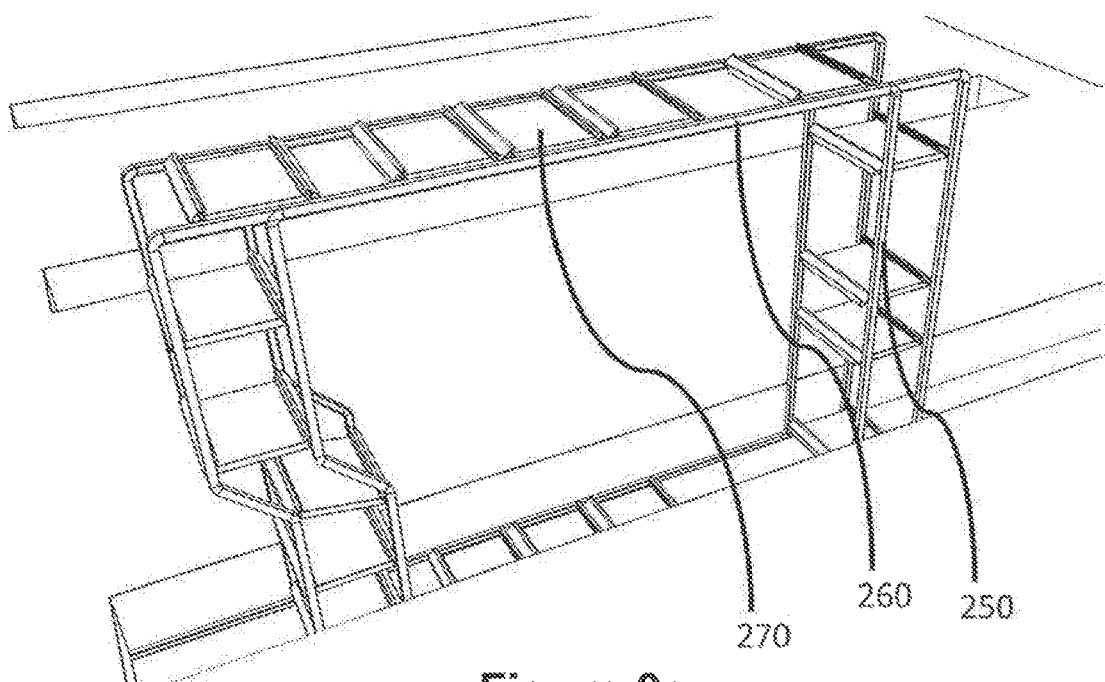
Figure 9B:
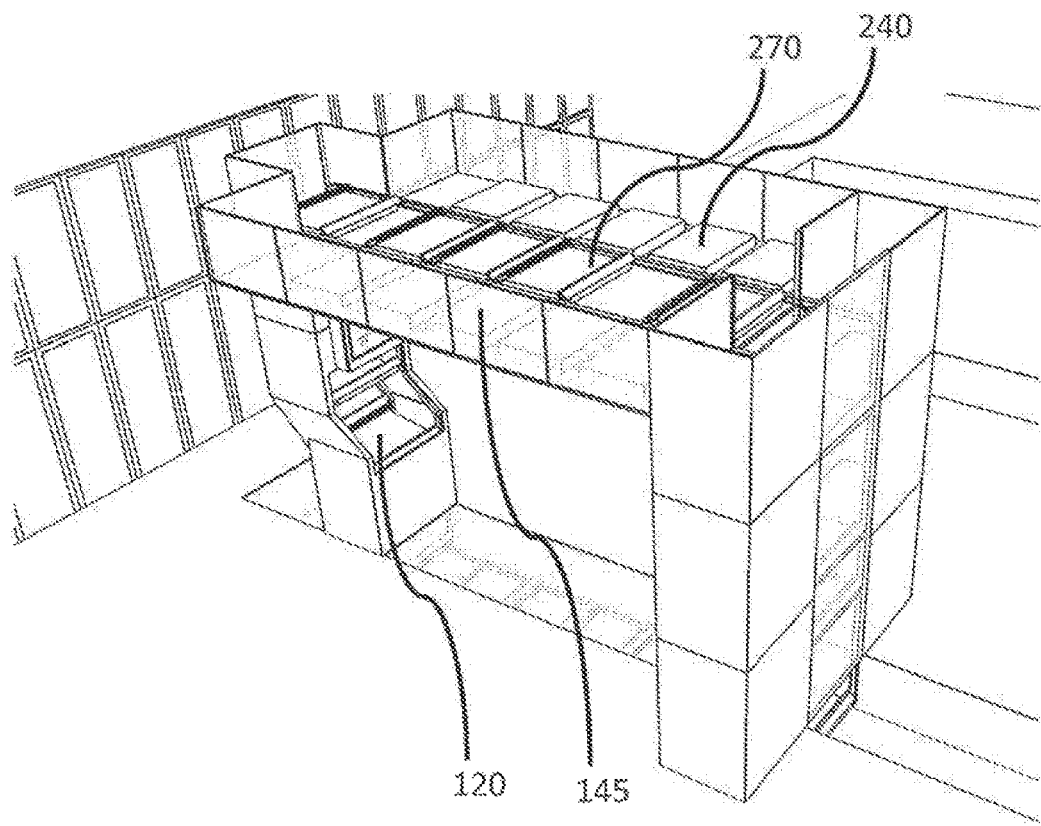
Figure 9C:
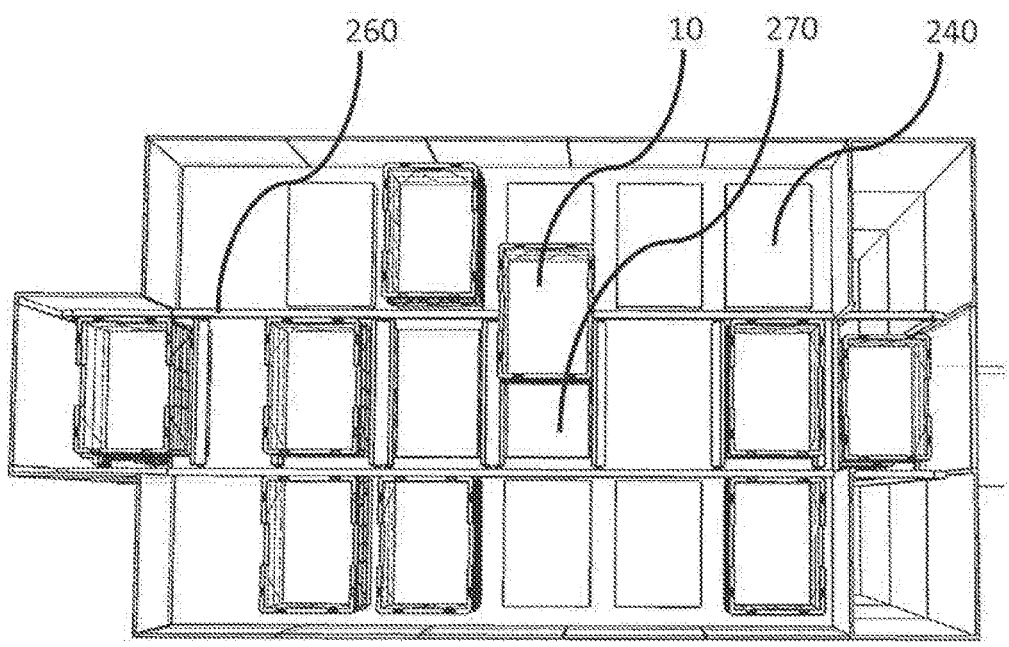
Figure 9D:
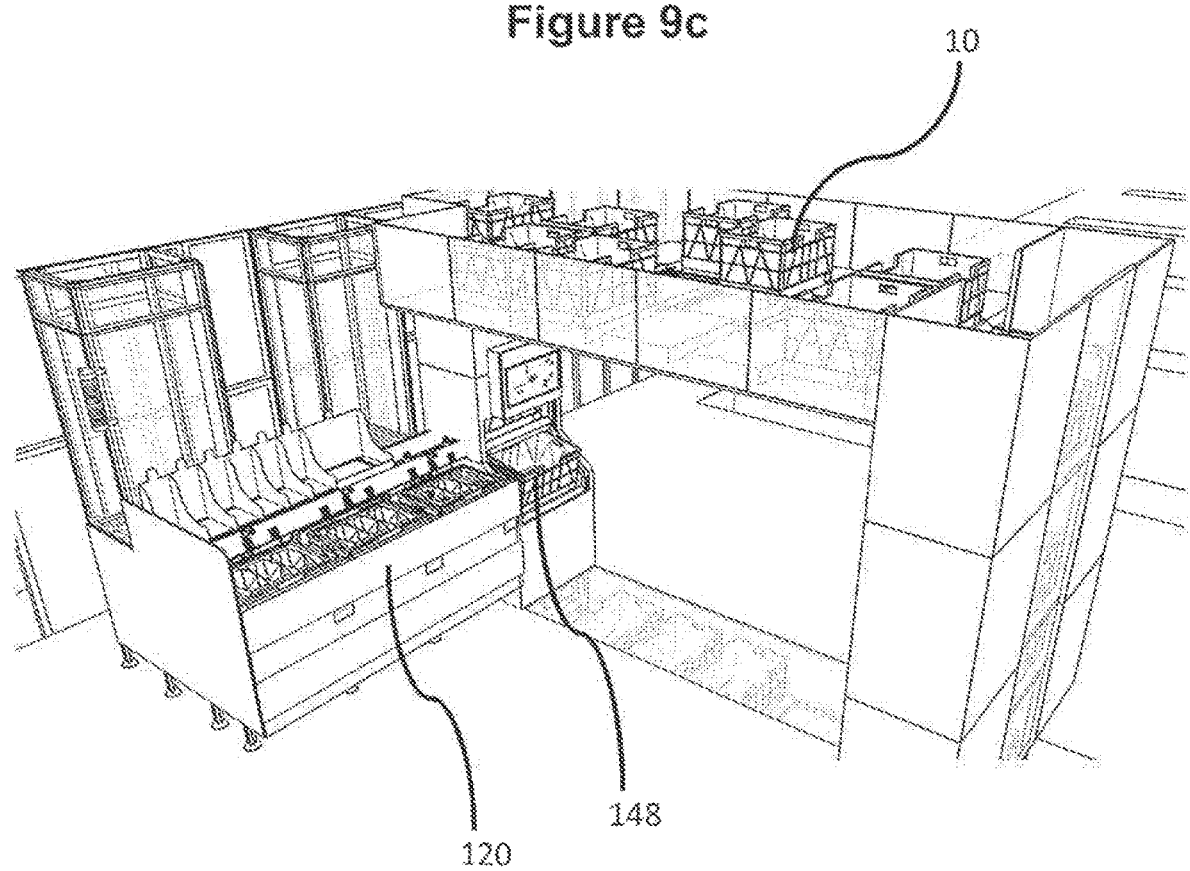
Figure 10:
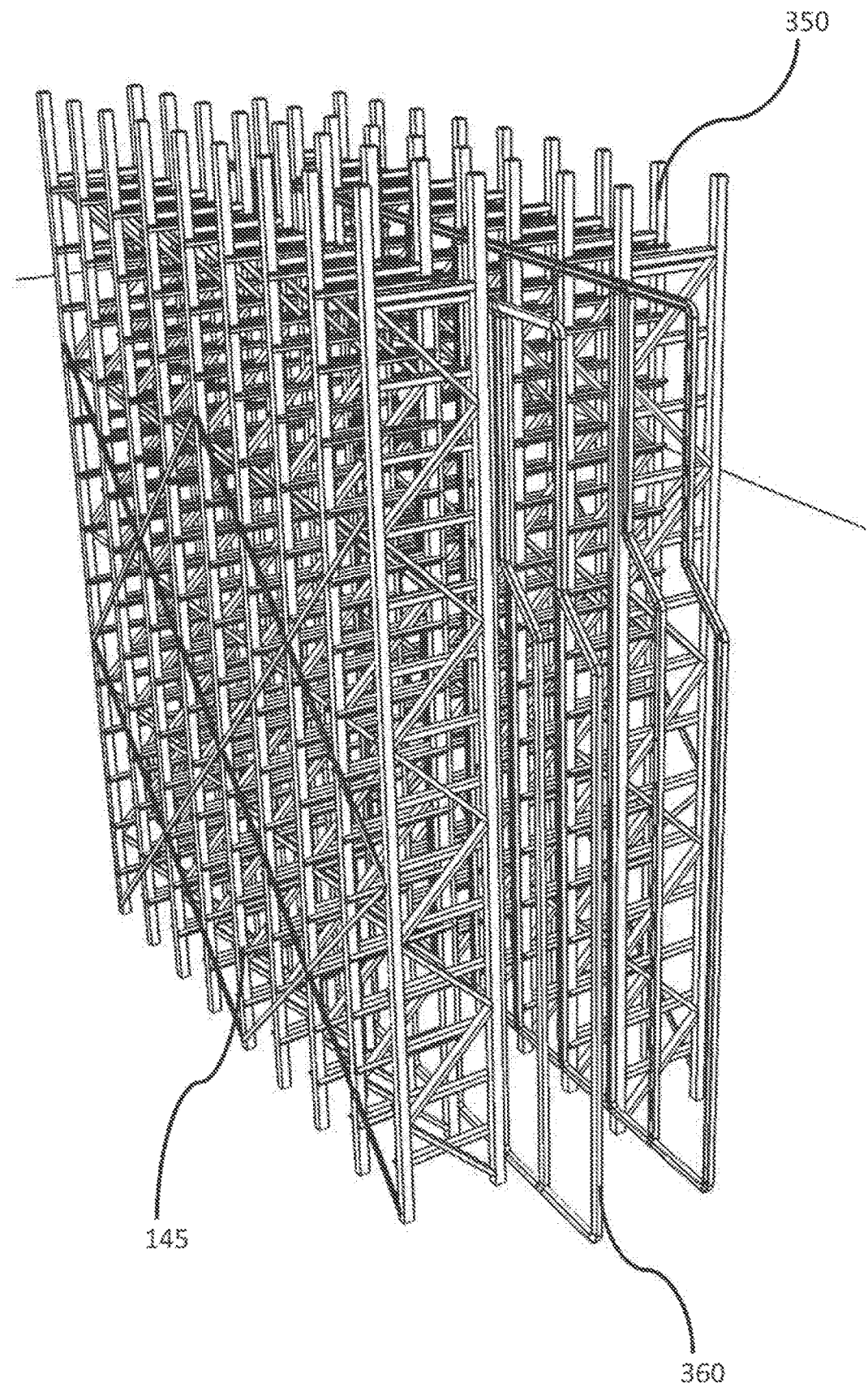
Figure 11:
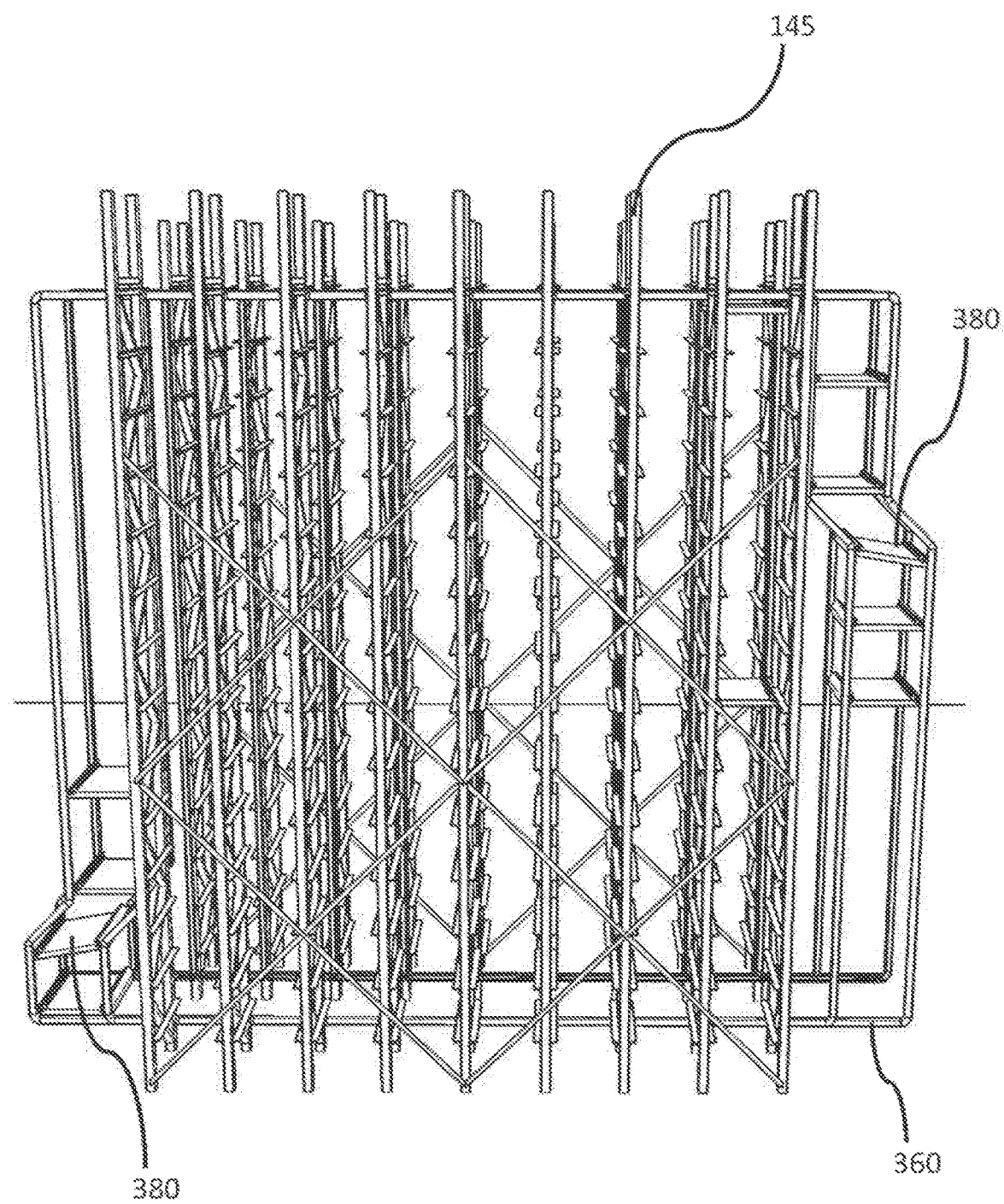
Figure 12:
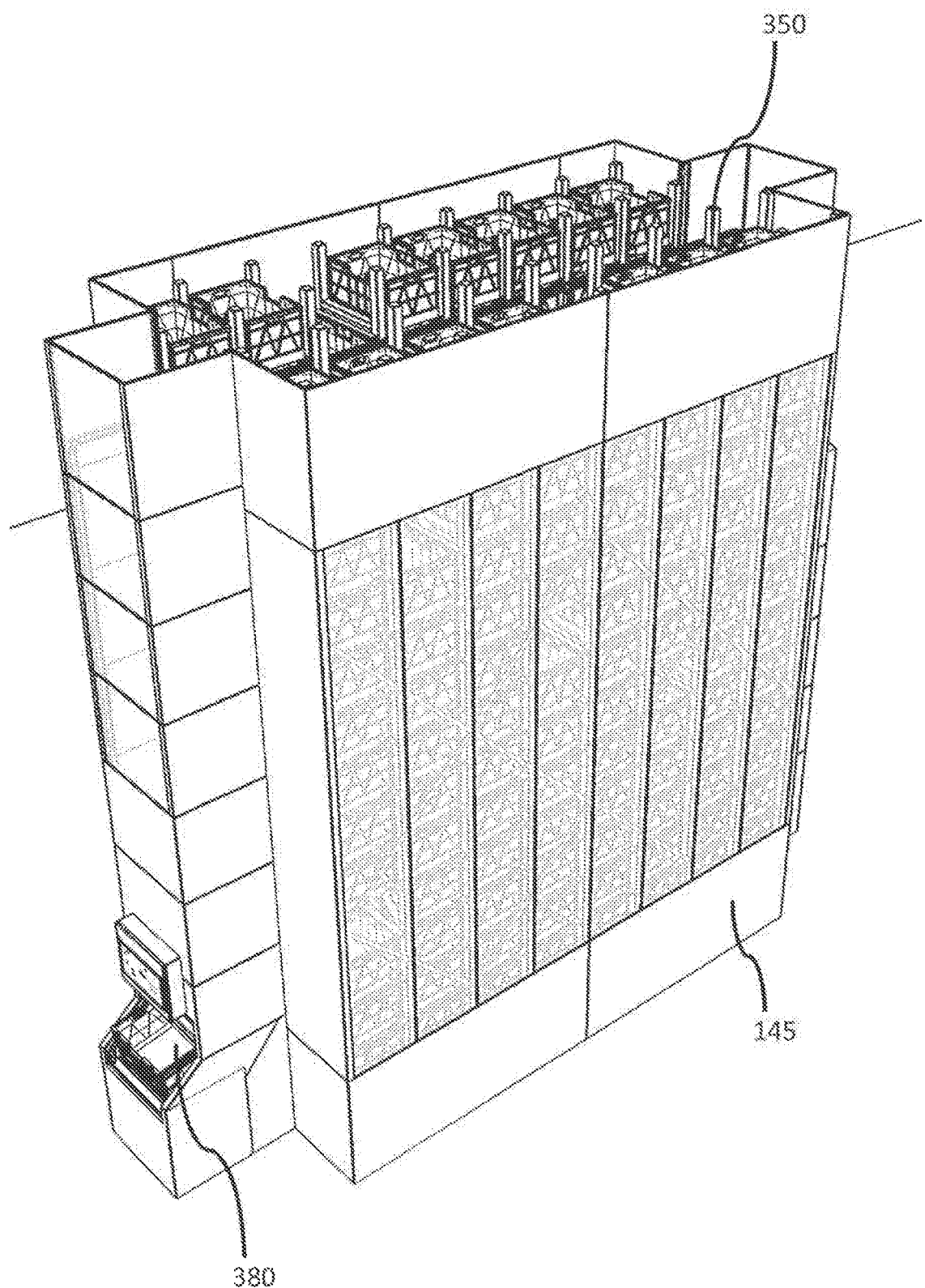
Figure 13:
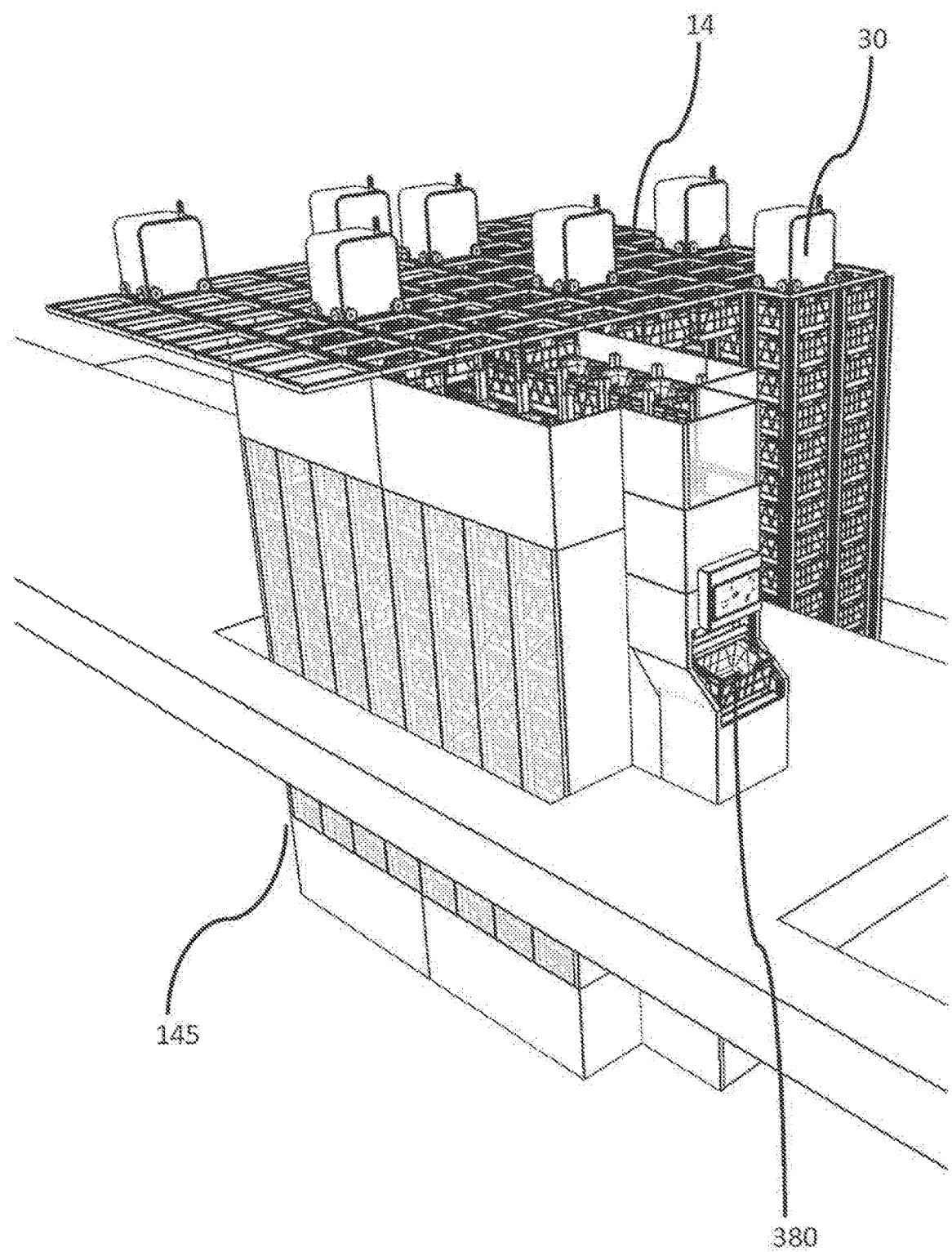

Embodiments of the present invention will now be described, by way of example only, with reference to the remainder of the accompanying drawings, in which like reference numerals are used for like features, and in which:

FIG. 5a is a schematic perspective view of a first embodiment of the invention showing a storage and sequencing portion adjacent a storage and handling system of the form shown in FIGS. 1 to 4;

FIG. 5b is an alternative schematic perspective view of the embodiment of the invention shown in FIG. 5a, showing drop off and pick up points enabling bins to be transferred from the storage system in to the storage and sequencing portion;

FIG. 6a shows a schematic perspective view of a second embodiment of the invention, showing the sequencing and storage portion between the object handling and storage system and a workstation, the sequencing and storage portion comprising a frame having a plurality of bin storage positions thereon, the frame further comprising a track on which the bins are moveable;

FIG. 6b shows an alternative schematic perspective view of the embodiment of FIG. 6a;

FIG. 7 shows a schematic perspective view of a sequencing and storage portion of an object handling system in accordance with a further form of the second embodiment of the invention, the sequencing and storage portion comprising two interacting frames of the type shown in FIGS. 6a and 6b being located between the object handling system and two workstations;

FIG. 8a is a schematic perspective view of a third embodiment of the invention, showing the storage and sequencing portion between the object handling and storage system and a workstation, the sequencing portion comprising moving means for engaging and removing bins from within a stack of bins in a modified portion of the object handling and storage system;

FIG. 8b shows an enlarged view of the moving means of FIG. 8a showing a bin being removed from within a stack of totes within the sequencing and storage portion of the object handling and storage system;

FIG. 9a shows a schematic perspective view of a fourth embodiment of the invention showing one part of the storage and sequencing portion, the part comprising a frame having a track with vehicle means mounted thereon, the vehicle means adapted so as to carry storage bins;

FIG. 9b shows a schematic perspective view of the frame of FIG. 9a located adjacent a workstation of the object handling and storage system, the frame being further provided with storage positions thereon and the track mechanism enabling bins to be presented at an output port of the frame such that objects therein may be accessed at from the workstation;

FIG. 9c shows a schematic plan view of the sequencing and storage portion of FIG. 9b showing a plurality of bins in storage positions and a plurality of bins on the track mechanism;

FIG. 9d shows the fourth embodiment of the invention of FIGS. 9a, 9b and 9c in operation adjacent a workstation;

FIG. 10 shows a schematic perspective view in accordance with a fifth embodiment of the invention showing part of a storage and sequencing portion, the part comprising a frame having a track with vehicle means mounted thereon, the vehicle means adapted so as to carry storage bins;

FIG. 11 shows a schematic side view of the frame of the sequencing and storage portion as shown in FIG. 10, the frame having an input port and an output port, the ports providing positions on the frame for accessing objects stored within the bins when the bins are located on the frame;

FIG. 12 shows a schematic perspective view of the sequencing and storage portion in accordance with the fifth embodiment of the invention, the frame of FIGS. 10 and 11, comprising the output port from which objects stored in the bins may be accessed; and FIG. 13 shows a schematic perspective view of the sequencing and storage frame of FIGS. 10, 11, and 12 located adjacent an object handling and storage system.

DETAILED DESCRIPTION OF EMBODIMENTS
OF THE INVENTION

FIG. 5a is a perspective view of a sequencing and storage portion of an object handling, storage and retrieval system 100 according to a first embodiment of the present invention. The storage system 100 is generally similar to the known system described above with reference to FIGS. 1 to 4, and comprises a plurality of storage containers or bins 10 stacked on top of one another to form a plurality of stacks 12. The stacks 12 are arranged within a frame structure 14.

The frame structure 14 comprises a plurality of upright members 16 that extend in the Z direction and support horizontal members 18, 20. A first set of parallel horizontal members 18, arranged in the X direction, is disposed perpendicular to a second set of parallel horizontal members 20 (not shown in FIG. 5), arranged in the Y direction. The horizontal members 18, 20 form a plurality of horizontal grid structures supported by the upright members 16. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. A first set 22a of parallel rails 22 and a second set 22b of parallel rails 22 are provided to guide movement of load handling devices in the X and Y directions, respectively, across the top of the frame structure 14.

FIG. 5a further shows a sequencing and storage portion, in accordance with the first form of the invention, located adjacent the object handling, storage and retrieval system 100. The sequencing and storage portion comprises a series of conveyors 110 positioned between the storage system 100 and the workstation 120 at which users pick objects from storage containers 10 in to delivery containers DT. In the embodiment of FIGS. 5a and 5b, storage containers 10 are sequenced for arrival at the workstation such that the user may pick the required object directly from the storage container 10 in to the correct delivery container DT. The storage containers 10 containing the objects to be picked travel on conveyors 110' and the delivery containers DT comprising customer orders travel on separate but adjacent conveyors 110".

The storage containers 10 comprising objects to be picked are located in the object handling and storage system 100.

In use, a load handling device 30, operating under the control of a computer control utility picks a target container 10 from a stack 12 within the storage system 100. The load handling device 30 carries the container 10 to a drop off point 130. The drop off point 130 may comprise a port 24 (as shown in FIG. 4) or may comprise chute means above the conveyor 110 as shown in FIG. 5b. The storage container 110 is lowered from the load handling device on to the conveyor 110'. If the storage container 10 comprises an object immediately required to be picked at the workstation in to a delivery container DT, the container 10 is transferred to the workstation 120 via conveyor means 110. However, if storage containers 10 comprising alternative objects are required at the workstation prior to the presently described storage container 10, diverting means (not shown) act on the target container to divert the present storage container 10 in to one of a number of temporary storage location points 140'. When the control utility determines that the presently described target storage container 10 is required at the workstation 120, the diverting means acts in the opposite fashion to move the storage container 10 from the temporary storage location position 140' back on to the storage container conveyor 110' for transmission to the workstation 120.

In a similar manner, when a delivery container DT is moved from the storage system 100 to the workstation 120, the arrival of the given delivery container DT may be sequenced in a similar manner to that described for the storage container 10 under the control of the computer utility (not shown). The delivery container DT may be stored in temporary storage positions 140" adjacent the delivery container conveyor 110" and diverted in to the storage position 140" from the conveyor 110" by suitable diverting means (not shown). Again, in a manner similar to that described with reference to the storage container 10, when the delivery container DT is required at the workstation, the diverting means acts under the control of the computer utility to move the delivery container DT from the temporary storage position to the delivery conveyor means 110" for onward movement to the workstation 120.

As shown in FIGS. 5a and 5b, the delivery container conveyor 110" and the storage container conveyor 110' comprise loops of conveyor such that the storage containers 10 and the delivery containers DT leave the storage system travel via the load handling devices 30 and the conveyors means 110' and 110" to the workstation 12 and back to the storage system 100. However, it will be appreciated that the conveyors 110' and 110" may receive and return the containers 10, DT from and to alternative locations and not back to the storage system 100.

It will be appreciated that the present embodiment describes a system where both the delivery container conveyor 110" and the storage container conveyor 110' comprise a plurality of temporary storage locations 140" and 140' respectively. However, it is not a requirement that both conveyor means 110" and 110' comprise temporary storage locations, either one of the conveyor means 110 may comprise temporary storage positions 140.

A second embodiment of the invention is described with reference to FIGS. 6a, 6b and 7 of the accompanying diagrammatic drawings.

FIG. 6a shows the framework 14 of the storage system 100 located adjacent a sequencing and storage portion 145 in accordance with a further form of the invention. As shown in FIG. 6a, a frame 150 is located between the storage system 100 and the workstation 120. The frame 150 comprises a track 160 on which storage containers 10 are located. As further shown in FIGS. 6a and 6b, the frame 150 of the second embodiment comprises a track 160 having container locating positions 155 thereon.

In use, load handling devices 30 operable on the storage system 100 locate and lift the target container 10 from a stack 12. The load handling device 30 transports the container 10 to a drop off point 171 above the frame 150 of the sequencing and storage portion 145. Once in position above the frame 150, the load handling device lowers the storage container 10 into a position on the frame 150. The frame 150 comprises a number of positions that may be used to store containers 10 comprising fast moving or frequently required items from the storage system 100. The track 160 may be moved around the frame 150 thereby moving the containers 10 located thereon. The containers 10 are located on the track by container moving device 170, such as struts, vehicles or shuttles. When moved around the frame 150, the track 160 and the associated moving device cause the containers 10 to move around the frame 150.

The frame 150 comprises an output point 148 from which a container 10 may be output to the workstation 120 when the container 10 is adjacent the output point. The output point may comprise diverter means as previously described to move the container 10 from the frame 150 towards the workstation 120. The container 10 output may be moved towards the workstation 120 via any suitable means such as conveyor means. FIG. 6a shows, via arrows, the route a target container 10 may take through the workstation.

In a similar manner to that described above with reference to the previous embodiment, the container 10 remains in the temporary storage position within the frame 150 until the control utility determines that the container 10 is required at the workstation. At this point, the required target container is diverted from the frame 150 on to means to transport the container 10 to the workstation from where the desired object is picked in to a delivery container DT. Once the desired object is picked, the container 10 is returned to the frame 150 until required again at the workstation 120. If the contents of the storage container 10 is depleted the storage container 10 may be refilled at a decant station of the frame 150 or of the workstation (not shown).

In the embodiment described with reference to FIGS. 6a, 6b and 7, the frame 150 handles storage containers 10 only. As shown in FIGS. 6a and 6b delivery containers DT reach the workstation 120 via drop off points 171 in the storage system 100. Load handling devices 30 lower delivery containers DT to the workstation 120 from above. However, it will be appreciated that the delivery containers DT may reach the workstation from the storage system 100 via any suitable means. Furthermore, a storage and sequencing frame 150 as described with reference to storage containers 10 may be used.

As shown in FIG. 7, two sequencing and storage portions 145 comprising two linked frames are shared between a single workstation 120. In this form of the second embodiment, the storage containers 10 stored in temporary locations within the frames comprise objects required by one or both workstations 120. The control utility (not shown) monitors the position of all the containers 10 located in the frames, the containers 10 being moved to the appropriate workstation 120 via the frame output port associated with the relevant workstation 120. It will be appreciated that a plurality of vertical guide profiles are provided in the system described herein. However, for clarity these guide profiles are not shown. FIGS. 8a and 8b show a third embodiment of the invention comprising a storage and sequencing portion 145 located between the storage system 100 and a workstation 120.

As shown in FIG. 8a, the storage and sequencing portion 145 comprises a modified section of framework 14 enabling a stack 12 of containers 10 to be accessed from the side. A container moving device 170 is located on a motorised upright 165 such that the device 170 can access any container 10 in the modified portion of the framework. The container moving device 170 acts so as to remove a target container 10 from the stack 12 without having to completely remove the non-target containers above the target container 10. As shown in FIG. 8b, the container moving device 170 is positioned adjacent the target container 10 and then inserted around the target container 10 such that the non-target containers above the target container 10 are lifted off the target container whilst the non-target containers below the target container are held in place. The target container 10 is then moved on to the container moving device 170 and withdrawn from the stack 12. Once withdrawn the target container is moved to a drop off point of a workstation 120 via the motorised upright 165.

It will be appreciated that the container moving device 170 comprises means for disengaging the non-target containers from the target container 10. Furthermore, the container moving device 170 comprises conveyor means 172 for moving the container out of the stack. It will be appreciated that any suitable form of disengaging means 174 and conveyor means may be used capable of disengaging a container from a stack and moving out with the stack 12.

It will be appreciated that the motorised upright 165 is moveable on a track located adjacent the base of the storage system between the storage system 100 and the workstation 120. The container moving device 170 is movable up and down the motorised upright 165 via suitable drive means. Furthermore, the motorised upright 165 is movable along the side of the storage system via suitable track means.

Again, whilst this embodiment is described with reference to storage containers 10, the invention is equally applicable to movement of delivery containers DT.

FIGS. 9a, 9b, 9c, and 9d show a fourth embodiment of the invention in which the sequencing and storage portion 145 of the storage system 100 comprises a frame 250, the frame comprising a track 260 on which vehicles 270 are driven. The vehicles 270 comprise temporary storage locations 240 on which containers 10 may be stored prior to movement to a workstation 120. The frame 250 and the associated track and vehicles enable a computer controlled utility to sequence the arrival of the containers 10 at the workstation 120 irrespective of the order in which the containers arrive at the storage and sequencing portion from the storage system 100. As shown in FIG. 9b, additional storage locations 240' are provided adjacent the top surface of the frame, the storage locations 240 and 240' enabling fast moving or frequently required containers 10 to be positioned close to the workstations 120 to reduce the number of times such containers 10 need to be lifted by load handling devices 30 from the storage system 100.

In a similar manner to that described above with reference to the preceding embodiments of the invention, the frame 250 is loaded with containers 10 delivered to the frame 250 by load handling devices 30 operable on the storage system 100.

For example, a target container 10 comprising objects required at the workstation 120 is located in the storage system 100 and picked up from the stack 12 in which it is located by a load handling device 30. The load handling device 30 transports the container 10 within the vehicle body of the load handling device 30 to a drop off point 24 on the storage system 100.

The container 10 is deposited from the load handling device 30 to a storage position adjacent the frame 250. Alternatively it is possible for the load handling device 30 to deposit the container 10 directly on to one of the storage position 240' defined by a vehicle location 270 on the track 260 of the frame 250.

Containers 10 deposited into storage locations 240 or 270 are moveable between locations via suitable diverting means.

The track 260 moves around the frame 250 under the control of the computer utility. The containers 10 are moved on and off the track 260 as required. The frame 250 further comprises a section locatable adjacent a workstation 120. The containers 10 move around the frame 250 on the vehicles 270, the vehicles 270 moving on the track 260. The frame and track interact such that at the point when the container 10 is adjacent a workstation 120, the container 10 is presented to the operator at the workstation in such a manner that the objects located within the container 10 are presented in an easily reachable manner. In this way the operator may remove the required object. It will be appreciated, as shown in FIGS. 9a, 9b and 9d that the frame 250, track 260 and vehicle 270 arrangement is completely encased for safety reasons. The only point at which the container 10 is accessible is the point when the container 10 is adjacent the workstation 120.

This embodiment is again described with reference to storage containers 10. However, a similar system may be used for storage and sequencing of delivery containers DT within the context of a fulfilment system for objects and goods ordered via an online retail environment.

It will be appreciated that the embodiments described above are described in terms of a storage system comprising items for retrieval and picking to fulfil orders in relation to an online ordering scenario. However, it will be appreciated that such storage systems may be adapted for use in many other applications and need not be limited to the specific examples described here.

In a fifth embodiment of the invention, a sequencing and storage portion is interposed between a storage system 100 and a workstation 120. In the fifth embodiment as shown in FIGS. 10, 11, 12 and 13 a storage and sequencing frame 350 is shown. The frame 350 comprises a track 360 having shuttles 370 mounted thereon. In a similar manner to that described with reference to the fourth embodiment of the invention, containers 10 are delivered to the sequencing and storage frame 350 by load handling devices 30 from the storage system 100. The frame 350 may store a plurality of containers 10 in stationary storage locations 340 adjacent the track 360 or may store containers 10 in movable storage positions on the track 360 associated with shuttles 370. The containers 10 may be moved from the stationary storage positions 340 on to shuttles 370 on the track 360 or from the shuttles 370 to the stationary storage locations 340 by suitable diverting means.

The containers 10 are accessed at the workstation 120 in a similar manner to that described with reference to the fourth embodiment, namely the track 360 and the shuttles 370 are arranged such that when in use, the track moving around the frame is arranged such that the shuttles present each container 10 in turn to a port adjacent the workstation, the shuttle and the track interacting at the point adjacent the workstation 120 such that the container 10 is presented in an easily accessible manner.

This embodiment is again described with reference to storage containers 10. However, a similar system may be used for storage and sequencing of delivery containers DT within the context of a fulfilment system for objects and goods ordered via an online retail environment.

In all of the embodiments described above, a sequencing and storage portion is interposed between a storage system and a workstation. It is an object of all of the embodiments of the invention described above that the portion between the main storage system and the workstation acts so as to improve the efficiency of the system as a whole. In storing containers that are required to be frequently access or that contain goods required at the workstations regularly close to the workstations, fewer containers require accessing by load handling devices either by digging or by simply lifting from the top of the stacks in the storage system. This improves the speed with which orders can be picked at the workstations and therefore reduces the lead time for picking an order. This makes the system more responsive to changes closer to delivery times.

It will be appreciated that there are many ways of achieving this objective using a sorting and sequencing frame interposed between the storage system and the workstation. The above described embodiments are examples only and variations or alterations to the specific embodiments may be envisaged that do not depart from the central inventive concept embodied herein. The specific mechanisms by which the invention is embodied above are not to be considered limiting as a skilled person in the art would be able to achieve the mechanics of the invention in many ways whilst not departing from the general concept described above.

It will be appreciated that whilst the storage and sequencing portion is described as being interposed between the storage system and the workstation, it will be appreciated that it may be physically located closer to the storage system or the workstation. Furthermore, it may form a physical part of the storage system or of the workstation. Indeed it may be used to physically join the storage system to the workstation.

Additionally, it will be appreciated that the sequencing and storage portion of the system may be physically separate from both the storage system and the workstation.

Moreover, it will be appreciated that a portion of the grid may extend over the sequencing and storage portion in order to facilitate the drop off of containers from the load handling devices. Alternatively, the load handling devices may deposit the containers 10 at an intermediate location between the storage system and the sequencing and storage portion.

In all the embodiments described above references are made to storage containers and delivery containers. It will be appreciated that these containers may take the same or different forms and that the storage and sequencing portion may be sized and adapted accordingly for alternative configurations of containers.

Furthermore, it will be appreciated that in all references to frames, frameworks and upright the structural members may be formed from any suitable material including but not limited to metals such as aluminium and steel and suitable structural plastics materials.

Moreover it will be appreciated that storage and sequencing portions as described above may be positioned between the storage system described and every workstation or only between a fraction of the workstations and the storage system as described.

It will be appreciated that the embodiments described above are described in terms of a storage system comprising items for retrieval and picking to fulfil orders in relation to an online ordering scenario for groceries. However, it will be appreciated that such storage systems may be adapted for use in many other applications and need not be limited to the specific examples described here. For example, such storage systems may be used for parcel sortation in a mail handling system.

Whilst the specific embodiments described relate to a system comprising load handling devices having a cavity located within a body, the cavity comprising means for carrying a container, other forms of load handling device may be envisaged. For example, a load handling device having a cantilever portion and winch means for lifting the containers may replace the load handling device described above.

It will be appreciated that storage systems can be designed for a particular application using various combinations of load handling devices and arrangements described above. Many variations and modifications not explicitly described above are also possible without departing from the scope of the invention as defined in the appended claims.

The invention claimed is:

1. A temporary storage and sequencing portion for an object handling and retrieval system, the object handling and retrieval system including an automated storage system for storing a plurality of containers, at least one workstation, and a container drop off point, the at least one work station and the temporary storage and sequencing portion configured to engage with the container drop off point and the temporary storage and sequencing portion comprising:
a frame, wherein the frame includes a plurality of temporary storage positions for storing containers of the plurality of containers;
a track mounted on the frame, the track engaging with the container drop off point for moving and placing the containers into the temporary storage positions; and a controller configured to control the object handling and retrieval system so that the track engages with the at least one workstation for removing the containers from the temporary storage positions for delivery to the at least one workstation to adjust an order of the containers delivered to the working station, irrespective of the order in which the containers arrived at the drop off point.

2. The temporary storage and sequencing portion according to claim 1, comprising:
struts, vehicles or shuttles arranged on the track for moving the containers around the track from the temporary storage positions to the workstation.

3. The temporary storage and sequencing portion according to claim 1, wherein the frame comprises a first frame and a second frame, the first frame linked to the second frame, and the first frame and the second frame each configured to engage with a single workstation of the at least one workstation to deliver containers to the single workstation.

4. The temporary storage and sequencing portion according to claim 1, wherein the frame comprises a first frame and a second frame, the first frame linked to the second frame and the first and second frame configured to deliver containers to a first workstation and a second workstation of the at least one workstations.

5. The temporary storage and sequencing portion according to claim 1, wherein the frame is configured to store a plurality of containers in a stack.

6. The temporary storage and sequencing portion according to claim 1, comprising vehicles arranged on the tracks and configured to temporarily store containers as a movable storage position.

7. The temporary storage and sequencing portion according to claim 6, comprising stationary storage positions.

8. The temporary storage and sequencing portion according to claim 1, wherein the frame is configured to be located adjacent to the workstation.

9. The temporary storage and sequencing portion according to claim 1, wherein the frame is configured to be located adjacent to the object handling retrieval system.

10. The temporary storage and sequencing portion according to claim 1, wherein the frame is configured to be located between the storage system and the workstation.

11. The temporary storage and sequencing portion according to claim 1, wherein the container stored in the temporary storage positions is a storage container.

12. The temporary storage and sequencing portion according to claim 1, wherein the container stored in the temporary storage positions is a delivery container.

13. The temporary storage and sequencing portion according to claim 1, comprising:
an output port, wherein the track is configured to present containers to the output port to provide access to the workstation.

14. The temporary storage and sequencing portion according to claim 1, wherein the track is completely encased and the only container access point is adjacent to the at least one workstation.

* * * * *